United States Patent
Wei et al.

(10) Patent No.: US 10,158,299 B1
(45) Date of Patent: Dec. 18, 2018

(54) COMMON VOLTAGE REDUCTION FOR ACTIVE FRONT END DRIVES

(71) Applicant: Rockwell Automation Technologies, Inc., Mayfield Heights, OH (US)

(72) Inventors: Lixiang Wei, Mequon, WI (US); Yujia Cui, Whitefish Bay, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/956,008

(22) Filed: Apr. 18, 2018

(51) Int. Cl.
  *H02M 5/45* (2006.01)
  *H02M 5/458* (2006.01)
  *H02M 1/12* (2006.01)

(52) U.S. Cl.
  CPC ........... *H02M 5/4585* (2013.01); *H02M 1/12* (2013.01); *H02M 2001/123* (2013.01)

(58) Field of Classification Search
  CPC ...................... H02M 1/12; H02M 2001/123
  See application file for complete search history.

(56) References Cited

U.S. PATENT DOCUMENTS

| | | | |
|---|---|---|---|
| 4,443,841 A | 4/1984 | Mikami et al. | |
| 4,783,728 A | 11/1988 | Hoffman | |
| 4,894,621 A | 1/1990 | Koenig et al. | |
| 4,978,894 A * | 12/1990 | Takahara | H02M 5/4505 318/768 |
| 5,298,848 A | 3/1994 | Ueda et al. | |
| 5,361,196 A | 11/1994 | Tanamachi et al. | |
| 5,502,633 A | 3/1996 | Miyazaki et al. | |
| 5,625,545 A | 4/1997 | Hammond | |
| 5,638,263 A | 6/1997 | Opal et al. | |
| 5,642,275 A | 6/1997 | Peng et al. | |
| 5,790,396 A | 8/1998 | Miyazaki et al. | |
| 5,933,339 A | 8/1999 | Duba et al. | |
| 5,986,909 A | 11/1999 | Hammond et al. | |
| 6,005,788 A | 12/1999 | Lipo et al. | |
| 6,031,738 A | 2/2000 | Lipo et al. | |
| 6,058,031 A | 5/2000 | Lyons et al. | |

(Continued)

FOREIGN PATENT DOCUMENTS

| | | |
|---|---|---|
| CN | 1190278 | 8/1998 |
| CN | 1253999 | 5/2000 |

(Continued)

OTHER PUBLICATIONS

Abu-Rub et al.,"Medium-Voltage Multilevel Converters—State of the Art, Chellenges, and Requirements in Industrial Applications", IEEE Transactions on Industrial Electronics, vol. 57, No. 8, Aug. 2010, pp. 2581-2596.

(Continued)

Primary Examiner — Yusef A Ahmed
(74) Attorney, Agent, or Firm — Fay Sharpe LLP (57) ABSTRACT

A power conversion system, a non-transitory computer readable medium, and a method of operating a power conversion system, in which inverter switching control signals are generated in a first mode according to an inverter carrier signal having an inverter switching frequency, and according to inverter modulation signals, to operate switches of an inverter to provide an AC output signal, and the inverter modulation signals are shifted in a second mode for low modulation index values to reduce common mode voltage.

19 Claims, 7 Drawing Sheets

(56) References Cited

U.S. PATENT DOCUMENTS

| | | |
|---|---|---|
| 6,075,350 A | 6/2000 | Peng |
| 6,075,717 A | 6/2000 | Kumar et al. |
| 6,166,929 A | 12/2000 | Ma et al. |
| 6,222,284 B1 | 4/2001 | Hammond et al. |
| 6,229,722 B1 | 5/2001 | Ichikawa et al. |
| 6,236,580 B1 | 5/2001 | Aiello et al. |
| 6,269,010 B1 | 7/2001 | Ma et al. |
| 6,295,215 B1 | 9/2001 | Faria et al. |
| 6,320,767 B1 | 11/2001 | Shimoura et al. |
| 6,359,416 B1 | 3/2002 | Rao et al. |
| 6,366,483 B1 | 4/2002 | Ma et al. |
| 6,411,530 B2 | 6/2002 | Hammond et al. |
| 6,477,067 B1 | 11/2002 | Kerkman et al. |
| 6,469,916 B1 | 12/2002 | Kerkman et al. |
| 6,541,933 B1 | 4/2003 | Leggate et al. |
| 6,556,461 B1 | 4/2003 | Khersonsky et al. |
| 6,617,821 B2 | 9/2003 | Kerkman et al. |
| 6,636,012 B2 | 10/2003 | Royak et al. |
| RE38,439 E | 2/2004 | Czerwinski |
| 6,697,271 B2 | 2/2004 | Corzine |
| 6,697,274 B2 | 2/2004 | Bernet et al. |
| 6,703,809 B2 | 3/2004 | Royak et al. |
| 6,720,748 B1 | 4/2004 | Seibel et al. |
| 6,795,323 B2 | 9/2004 | Tanaka et al. |
| 6,819,070 B2 | 11/2004 | Kerkman et al. |
| 6,819,077 B1 | 11/2004 | Seibel et al. |
| 6,842,354 B1 | 1/2005 | Tallam et al. |
| 6,859,374 B2 | 2/2005 | Pollanen et al. |
| 6,982,533 B2 | 1/2006 | Seibel et al. |
| 7,034,501 B1 | 4/2006 | Thunes et al. |
| 7,057,905 B2 | 6/2006 | Macmillan |
| 7,068,526 B2 | 6/2006 | Yamanaka |
| 7,106,025 B1 | 9/2006 | Yin et al. |
| 7,164,254 B2 | 1/2007 | Kerkman et al. |
| 7,170,767 B2 | 1/2007 | Bixel |
| 7,180,270 B2 | 2/2007 | Rufer |
| 7,215,559 B2 | 5/2007 | Nondahl et al. |
| 7,274,576 B1 | 9/2007 | Zargari et al. |
| 7,336,509 B2 | 2/2008 | Tallam |
| 7,342,380 B1 | 3/2008 | Kerkman et al. |
| 7,356,441 B2 | 4/2008 | Kerkman et al. |
| 7,400,518 B2 | 7/2008 | Yin et al. |
| 7,428,158 B2 | 9/2008 | Bousfield, III et al. |
| 7,471,525 B2 | 12/2008 | Suzuki et al. |
| 7,495,410 B2 | 2/2009 | Zargari et al. |
| 7,495,938 B2 | 2/2009 | Wu et al. |
| 7,511,976 B2 | 3/2009 | Zargari et al. |
| 7,568,931 B2 | 8/2009 | Hammond |
| 7,589,984 B2 | 9/2009 | Salomaki |
| 7,649,281 B2 | 1/2010 | Lai et al. |
| 7,738,267 B1* | 6/2010 | Tallam ............... H02M 1/44 363/35 |
| 7,800,254 B2 | 9/2010 | Hammond |
| 7,830,681 B2 | 11/2010 | Abolhassani et al. |
| 7,894,224 B2 | 2/2011 | Ulrich |
| 7,978,488 B2 | 7/2011 | Tanaka et al. |
| 8,008,923 B2 | 8/2011 | Hammond |
| 8,040,101 B2 | 10/2011 | Itoh et al. |
| 8,093,764 B2 | 1/2012 | Hammond |
| 8,107,267 B2 | 1/2012 | Tallam et al. |
| 8,130,501 B2 | 3/2012 | Ledezma et al. |
| 8,138,697 B2 | 3/2012 | Palma |
| 8,144,491 B2 | 3/2012 | Bendre et al. |
| 8,159,840 B2 | 4/2012 | Yun |
| 8,279,640 B2 | 10/2012 | Abolhassani |
| 8,279,641 B2* | 10/2012 | Kawamoto ......... B60L 11/00 363/37 |
| 8,400,793 B2 | 3/2013 | Jonsson |
| 8,441,147 B2 | 5/2013 | Hammond |
| 8,508,066 B2 | 8/2013 | Lee et al. |
| 8,619,446 B2 | 12/2013 | Liu et al. |
| 8,817,499 B2 | 8/2014 | Videt |
| 8,860,380 B2 | 10/2014 | Hasler |
| 8,929,111 B2 | 1/2015 | White |
| 9,036,379 B2 | 5/2015 | Schroeder |
| 9,318,976 B1* | 4/2016 | Wei ................... H02M 7/537 |
| 9,325,252 B2 | 4/2016 | Narimani et al. |
| 9,520,800 B2 | 12/2016 | Tian et al. |
| 9,559,541 B2 | 1/2017 | Cheng et al. |
| 2001/0048290 A1 | 12/2001 | Underwood et al. |
| 2005/0128777 A1* | 6/2005 | Yamanaka ........... H02M 7/483 363/98 |
| 2006/0267542 A1* | 11/2006 | Wei ................... H02M 7/219 318/807 |
| 2007/0211501 A1 | 9/2007 | Zargari et al. |
| 2007/0297202 A1 | 12/2007 | Zargari et al. |
| 2008/0019157 A1* | 1/2008 | Salomaki ............. H02M 1/126 363/41 |
| 2008/0079314 A1 | 4/2008 | Hammond |
| 2008/0081244 A1 | 4/2008 | Hammond |
| 2008/0088186 A1 | 4/2008 | Hammond |
| 2008/0151583 A1* | 6/2008 | Matsumoto .......... H02M 5/458 363/34 |
| 2008/0174182 A1 | 7/2008 | Hammond |
| 2008/0180055 A1 | 7/2008 | Zargari et al. |
| 2008/0278109 A1* | 11/2008 | Qian ................... H02M 1/126 318/803 |
| 2009/0058350 A1* | 3/2009 | Wei ................... H02P 27/08 318/722 |
| 2009/0073622 A1 | 3/2009 | Hammond |
| 2009/0085510 A1 | 4/2009 | Pande et al. |
| 2009/0128083 A1 | 5/2009 | Zargari |
| 2009/0175059 A1* | 7/2009 | Sakakibara ........ H02M 7/53875 363/36 |
| 2009/0184681 A1 | 7/2009 | Kuno |
| 2010/0025995 A1 | 2/2010 | Lang et al. |
| 2010/0078998 A1 | 4/2010 | Wei et al. |
| 2010/0080028 A1 | 4/2010 | Cheng et al. |
| 2010/0085789 A1 | 4/2010 | Ulrich et al. |
| 2010/0091534 A1 | 4/2010 | Tadano |
| 2010/0109585 A1 | 5/2010 | Iwahori et al. |
| 2010/0141041 A1 | 6/2010 | Bose et al. |
| 2010/0301975 A1 | 12/2010 | Hammond |
| 2011/0019449 A1 | 1/2011 | Katoh et al. |
| 2011/0095603 A1 | 4/2011 | Lee et al. |
| 2011/0141777 A1* | 6/2011 | Sakakibara ......... H02M 5/4585 363/69 |
| 2011/0176340 A1* | 7/2011 | Sakakibara ........... H02M 5/297 363/34 |
| 2011/0249479 A1 | 10/2011 | Capitaneanu et al. |
| 2012/0057380 A1 | 3/2012 | Abe |
| 2012/0057384 A1 | 3/2012 | Jones |
| 2012/0113698 A1 | 5/2012 | Inoue |
| 2012/0140532 A1* | 6/2012 | Tallam .............. H02M 7/53875 363/37 |
| 2012/0163046 A1* | 6/2012 | Hibino ................... H02P 27/08 363/37 |
| 2012/0195078 A1 | 8/2012 | Kroeze et al. |
| 2012/0195079 A1 | 8/2012 | Kroeze et al. |
| 2012/0201056 A1* | 8/2012 | Wei ................... H02M 5/4585 363/37 |
| 2012/0212982 A1* | 8/2012 | Wei ................... H02M 5/4585 363/37 |
| 2012/0218795 A1 | 8/2012 | Mihalache |
| 2012/0229061 A1* | 9/2012 | Itoh ....................... B60L 3/003 318/400.3 |
| 2013/0010504 A1 | 1/2013 | Xiao et al. |
| 2013/0121041 A1 | 5/2013 | Schroeder et al. |
| 2013/0121042 A1 | 5/2013 | Gan et al. |
| 2013/0180273 A1* | 7/2013 | Hatakeyama ........... F04B 35/04 62/115 |
| 2013/0223651 A1 | 8/2013 | Hoyerby |
| 2013/0249501 A1* | 9/2013 | Lu ........................ F03D 7/0224 322/21 |
| 2013/0272045 A1 | 10/2013 | Soeiro |
| 2013/0291578 A1* | 11/2013 | Hatakeyama ......... F25B 49/025 62/230 |
| 2013/0300380 A1 | 11/2013 | Brunotte et al. |
| 2014/0003099 A1 | 1/2014 | Dillig et al. |
| 2014/0036557 A1* | 2/2014 | Nondahl ................. H02M 1/12 363/71 |

(56) References Cited

U.S. PATENT DOCUMENTS

| | | | |
|---|---|---|---|
| 2014/0042817 A1 | 2/2014 | Zargari et al. | |
| 2014/0056038 A1* | 2/2014 | Yamamoto | H02M 5/297 363/36 |
| 2014/0063870 A1 | 3/2014 | Bousfield, III | |
| 2014/0146586 A1 | 5/2014 | Das et al. | |
| 2014/0204632 A1 | 7/2014 | Noetzold et al. | |
| 2014/0268928 A1 | 9/2014 | Wie et al. | |
| 2014/0268953 A1* | 9/2014 | Patel | H02M 7/217 363/89 |
| 2014/0268954 A1* | 9/2014 | Wei | H02M 7/217 363/89 |
| 2014/0300298 A1 | 10/2014 | Liu et al. | |
| 2014/0369089 A1* | 12/2014 | Sakakibara | H02M 5/4585 363/37 |
| 2014/0376287 A1 | 12/2014 | Wu et al. | |
| 2015/0009731 A1 | 1/2015 | Kim | |
| 2015/0146462 A1* | 5/2015 | Yamanaka | H02M 1/14 363/97 |
| 2015/0171733 A1 | 6/2015 | Zargari et al. | |
| 2015/0280608 A1 | 10/2015 | Yoscovich et al. | |
| 2015/0318791 A1* | 11/2015 | Baumann | H02M 5/458 318/504 |
| 2015/0355259 A1* | 12/2015 | Sartler | G01R 31/028 324/548 |
| 2015/0355262 A1* | 12/2015 | Hu | H02H 3/16 324/509 |
| 2016/0006367 A1* | 1/2016 | Wei | H02M 7/537 363/131 |
| 2016/0013715 A1* | 1/2016 | Patel | H02M 1/126 363/44 |
| 2016/0126861 A1* | 5/2016 | Wei | H02M 7/537 363/97 |
| 2016/0248334 A1* | 8/2016 | Patel | H03H 7/06 |
| 2016/0268948 A1 | 9/2016 | Choi et al. | |
| 2017/0353138 A1* | 12/2017 | Zhang | H02M 1/126 |
| 2018/0145602 A1* | 5/2018 | Wei | H02M 3/33507 |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 1400731 A | 3/2005 |
| CN | 2737060 | 10/2005 |
| CN | 1925289 | 3/2007 |
| CN | 101795057 A | 8/2010 |
| CN | 102005960 A | 4/2011 |
| CN | 102522913 A | 6/2012 |
| CN | 102624025 A | 8/2012 |
| CN | 102739030 A | 10/2012 |
| CN | 102983568 A | 3/2013 |
| CN | 103051167 A | 4/2013 |
| CN | 103051236 A | 4/2013 |
| CN | 103078539 A | 5/2013 |
| CN | 103312257 A | 9/2013 |
| EP | 0874448 | 10/1998 |
| EP | 1641111 A2 | 3/2006 |
| EP | 1713168 A3 | 10/2006 |
| EP | 2568591 A1 | 3/2013 |
| EP | 2698912 A2 | 2/2014 |
| EP | 2838189 A2 | 2/2015 |
| ES | 2378865 | 4/2012 |
| GB | 1295261 A | 11/1972 |
| GB | 2345594 A | 7/2000 |
| JP | 2006223009 | 8/2006 |
| JP | 2013012674 | 1/2013 |
| KR | 20080061641 A | 7/2008 |
| TW | 439350 | 6/2001 |
| WO | WO 2006107548 A1 | 10/2006 |
| WO | WO2012105737 A1 | 8/2012 |
| WO | WO2013091675 A1 | 6/2013 |
| WO | WO2013104418 A1 | 7/2013 |

OTHER PUBLICATIONS

Akagi et al., "A Passive EMI Filter for Eliminating Both Bearing Current and Ground Leakage Current From an Inverter-Driven Motor", IEEE Transactions on Power Electronics, 2006 , pp. 1459-1469.

Akagi et al., "An Approach to Eliminating High-Frequency Shaft Voltage and Ground Leakage Current From an Inverter-Driven Motor", IEEE Transactions on Industry Applications, 2004 , pp. 1162-1169.

Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.

Angulo, Mauricio, et al., "Level-shifted PMW for Cascaded Multilevel Inverters with Even Power Distribution", IEEE Power Electronics Specialists Conference (PESC), pp. 2373-2378, Jun. 2007.

Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.

Barbosa et al., "Active neutral-point-clamped multilevel converters," in Proc. IEEE 36th Power Electron. Spec. Conf., Jun. 16, 2005, pp. 2296-2301.

Bruckner et al., "The active NPC converter and its loss-balancing control," IEEE Trans. Ind. Electron., vol. 52, No. 3, pp. 855-868, Jun. 2005.

Cacciato et al., "Modified space-vector-modulation technique for common mode currents reduction and full utilization of the DC bus", in Proc. IEEE APEC Conf. Rec., 2009, pp. 109-115.

Cacciato et al., "Reduction of common mode currents in PWM inverter motor drives", IEEE Trans. Ind. Appl., vol. 35, No. 2, pp. 469-476, Mar./Apr. 1999.

Cavalcanti et al., "Modulation Techniques to Eliminate Leakage Currents in Transformerless Three-Phase Photovoltaic Systems", IEEE Transactions on Industrial Electronics, 2010 , pp. 1360-1368.

Celanovic et al., "A Comprehensive Study of Neutral-Point Voltage Balancing Problem in Three-Level Neutral-Point-Clamped Voltage Source PWM Inverters", IEEE Transactions on Power Electronics, vol. 15, No. 2, Mar. 2000, pp. 242-249.

Cengelci, E., et al., A New Medium Voltage PWM Inverter Topology for Adjustable Speed Drives, IEEE, 0-7803-4943-1, 1998, pp. 1416-1423.

Cha, Han Ju et al. An Approach to Reduce Common-Mode Voltage in Matrix Converter, Jul./Aug. 2003, IEEE, vol. 39, pp. 1151-1159.

Cha, Han Ju, "Analysis and Design of Matrix Converter for Adjustable Speed Drive and Distributed Power Sources", Aug. 2004, Texas A&M Univ., Doctor of Philosophy Dissertation Paper.

Chaudhuri, Toufann, et al., Introducing the Common Cross Connected Stage ($C^3S$) for the 5L ANPC Multilevel Inverter, IEEE, 978-1-4244-1668-4, 2008, pp. 167-173.

Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.

Choi et al., "A General Circuit Topology of Multilevel Inverter", Dept. of Electrical Engineering, Korea Advanced Institute of Science and Technology (KAIST), 1991 IEEE, 8 pgs.

De Broe, et al., "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.

Erdman, Russel J. Kerkman, David W. Schlegel, and Gary L. Skibinski, "Effect of PWM Inverters on AC Motor Bearing Currents and Shaft Voltages", 1996 IEEE.

Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

Floricau, Dan et al., A new stacked NPC converter: 3L-topology and control, Proceedings of the $12^{th}$ European Conf. on Power Electronics and Applications, EPE 2007, EPE Association, 2007, 10 pgs.

(56) References Cited

OTHER PUBLICATIONS

Glinka, M., Prototype of Multiphase Modular-Multilevel-Converter with 2 MW power rating and 17-level-output-voltage, IEEE, 0-7803-8399-0, 2004, pp. 2572-2576.

Guennegues et al., "Selective harmonic elimination PWM applied to H-bridge topology in high speed applications," in Proc. Int. Conf. Powereng, Mar. 18-20, 2009, pp. 152-156.

Guennegues, V., et al., A Converter Topology for High Speed Motor Drive Applications, IEEE Xplore, 2009, 8 pgs.

Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.

Hava et al., "A high-performance PWM algorithm for common-mode voltage reduction in three-phase voltage source inverters," IEEE Trans. Power Electron., vol. 26, No. 7, pp. 1998-2008, Jul. 2011.

Hiller, Mark et al., Medium-Voltage Drives; An overview of the common converter topologies and power semiconductor devices, IEEE Industry Applications Magazine, Mar.-Apr. 2010, pp. 22-30.

Horvath, "How isolation transformers in MV drives protect motor insulation", TM GE Automation Systems, Roanoke, VA, 2004.

Hua, Lin, "A Modulation Strategy to Reduce Common-Mode Voltage for Current-Controlled Matrix Converters", Nov. 2006, IEEE Xplore, pp. 2775-2780.

Iman-Eini, Hossein et al., "A Fault-Tolerant Control Strategy for Cascaded H-Bridge Multilevel Rectifiers", Journal of Power Electronics, vol. 1, Jan. 2010.

Kerkman, et al., "PWM Inverters and Their Influence on Motor Over-Voltage," 1997 IEEE.

Khomfoi, Surin et al., "Fault Detection and Reconfiguration Technique for Cascaded H-bridge 11-level Inverter Drives Operating under Faulty Condition", 2007 IEEE, PEDS 2007, pp. 1035-1042.

Kieferndorf et al., "A new medium voltage drive system based on anpc-5l technology," in Proc. IEEE-ICIT, Viña del Mar, Chile, Mar. 2010,pp. 605-611.

Kim et al., "A New PWM Strategy for Common-Mode Voltage Reduction in Neutral-Point-Clamped Inverter-Fed AC Motor Drives", IEEE Translations on Industry Applications, vol. 37, No. 6, Nov. 2001, pp. 1480-1845.

Kouro et al., "Recent advances and industrial applications of multilevel converters," IEEE Trans. Ind. Electron., vol. 57, No. 8, pp. 2553-2580, Aug. 2010.

Lai et al., "Optimal common-mode voltage reduction PWM technique for inverter control with consideration of the dead-time effects—part I: basic development," IEEE Trans. Ind. Appl., vol. 40, No. 6, pp. 1605-1612, Nov./Dec. 2004.

Lee, Hyeoun-Dong et al., "A Common Mode Voltage Reduction in Boost Rectifier/Inverter System by Shifting Active Voltage Vector in a Control Period", IEEE Transactions on Power Electronics, vol. 15, No. 6, Nov. 2000.

Lesnicar et al., "An Innovative Modular Multilevel Converter Topology Suitable for a Wide Power Range", 2003 IEEE Bologna PowerTech Conference, Jun. 23-26, Bologna Italy, 6 pgs.

Lesnicar, A., et al., A new modular voltage source inverter topology, Inst. of Power Electronics and Control, Muenchen, DE, Oct. 10, 2007, pp. 1-10.

Lezana, Pablo et al., "Survey on Fault Operation on Multilevel Inverters", IEEE Transactions on Industrial Electronics, vol. 57, No. 7, Jul. 2010, pp. 2207-2217.

Li, Jun, et al., A New Nine-Level Active NPC (ANPC) Converter for Grid Connection of Large Wind Turboines for Distributed Generation, IEEE Transactions on Power Electronics, vol. 26, No. 3, Mar. 2011, pp. 961-972.

Loh et al., "Reduced Common-Mode Modulation Strategies for Cascaded Multilevel Inverters", IEEE Transaction on Industry Applications, vol. 39, No. 5, Sep. 2003, pp. 1386-1395.

McGrath, Brendan Peter et al., "Multicarrier PMW Strategies for Multilevel Inverters," IEEE Transactions on Industrial Electronics, vol. 49, No. 4, pp. 858-867, Aug. 2002.

Meili et al., "Optimized pulse patterns for the 5-level ANPC converter for high speed high power applications," in Proc. 32nd IEEE IECON, Nov. 6-10, 2006, pp. 2587-2592.

Muetze, & A. Binder, "Don't lose Your Bearings", Mitigation techniques for bearing currents in inverter-supplied drive systems, 2006 IEEE.

Naik et al., "Circuit model for shaft voltage prediction in induction motors fed by PWMbased AC drives", IEEE Trans. Ind. Appl., vol. 39, No. 5, pp. 1294-1299, Nov./Dec. 1996.

O-Harvest, product information, Beijing Leader & Harvest Electric Technologies Co., Ltd., http:/www.ld-harvest.com/en/3-1-2.htm, retrieved from the Internet Apr. 11, 2013, 3 pgs.

Park, Young-Min, "A Simple and Reliable PWM Synchronization & Phase-Shift Method for Cascaded H-Bridge Multilevel Inverters based on a Standard Serial Communication Protocol", IEEE 41$^{st}$ IAS Annual Meeting, pp. 988-994, Oct. 2006.

Peng, "A Generalized Multilevel Inverter Topology with Self Voltage Balancing", IEEE Transactions on Industry Applications, vol. 37, No. 2, Mar./Apr. 2001, pp. 611-618.

Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

Rendusara, et al., "Analysis of common mode voltage-'neutral shift' in medium voltage PWM adjustable speed drive (MV-ASD) systems", IEEE Trans. Power Electron., vol. 15, No. 6, pp. 1124-1133, Nov. 2000.

Robicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web as Part 1, pp. 1-49; and Part 2, pp. 50-91).

Robicon Perfect Harmony, "The Drive of Choice for Highest Demands", Siemens, Copyright Siemens AG 2008, 16 pgs, .obtained from the World Wide Web Apr. 2013.

Robicon, "Perfect Harmony MV Drive Product Overview", 18 pgs . . . obtained from the World Wide Web Apr. 2013.

Rodriguez et al., "A New Modulation Method to Reduce Common-Mode Voltages in Multilevel Inverters", IEEE Transactions on Industrial Electronics, vol. 51, No. 4, Aug. 2004, 834-939.

Rodriguez et al., "Multilevel inverters: A survey of topologies, controls, and applications," IEEE Trans. Ind. Electron., vol. 49, No. 4, pp. 724-738, Aug. 2002.

Rodriguez et al., "Operation of a Medium-Voltage Drive Under Faulty Conditions", IEEE Transactions on Industrial Electronics, vol. 52, No. 4, Aug. 2005, pp. 1080-1085.

Rodriguez, et al., "Multilevel voltage source- converter topologies for industrial medium-voltage drives," IEEE Trans. Ind. Electron., vol. 54, no. 6, pp. 2930-2945, Dec. 2007.

Saeedifard, et al., "Operation and control of a hybrid seven-level converter," IEEE Trans. Power Electron., vol. 27, No. 2, pp. 652-660, Feb. 2012.

Saeedifard, Maryann et al., Analysis and Control of DC-Capacitor-Voltage-Drift Phenomenon of a Passive Front-End Five-Level Converter, IEEE Transactions on Industrial Electronics, vol. 54, No. 6, Dec. 2007, pp. 3255-3266.

Sedghi, S. et al., "A New Multilevel Carrier Based Pulse Width Modulation Method for Modular Multilevel Inverter", IEEE, 8$^{th}$ International Conference on Power Electronics—ECCE Asia (ICPE & ECCE), pp. 1432-1439, May 30-Jun. 3, 2011.

Sepahvand, Hossein et al., "Fault Recovery Strategy for Hybrid Cascaded H-Bridge Multi-Level Inverters", 2011 IEEE, pp. 1629-1633.

Serpa et al., "Fivelevel virtual-flux direct power control for the active neutral-point clamped multilevel inverter," in Proc. IEEE Power Electron. Spec. Conf.

Silva, Cesar et al., Control of an Hybrid Multilevel Inverter for Current Waveform Improvement, IEEE, 978-1-4244-1666-0, 2008, pp. 2329-2335.

Song, Wenchao et al., "Control Strategy for Fault-Tolerant Cascaded Multilevel Converter based STATCOM", 2007 IEEE, pp. 1073-1076.

Ulrich, James A., et al., Floating Capacitor Voltage Regulation in Diode Clamped Hybrid Multilevel Converters, IEEE, 978-1-4244-3439-8, 2009, pp. 197-202.

(56) References Cited

OTHER PUBLICATIONS

Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Wei, Sanmin et al., "Control Method for Cascaded H-Bridge Multilevel Inverter with Faulty Power Cells", 2003 IEEE, pp. 261-267.

Wen, Jun et al., Synthesis of Multilevel Converters Based on Single-and/or Three-Phase Converter Building Blocks, IEEE Transactions on Power Electronics, vol. 23, No. 3, May 2008, pp. 1247-1256.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Wu, Bin, "EE8407 Power Converter Systems", Topic 6, Multilevel Cascaded H-Bridge (CHB) Inverters, pp. 1-14, 2006.

Wu, Bin, "High-Power Converters and AC Drives", Wiley-IEEE Press, 2006, Chapter 7, pp. 119-142.

Wu, Bin, "High-Power Converters and AC Drives", Wiley-IEEE Press, 2006, Chapter 9, pp. 179-186.

Wu, High-Power Converters and AC Drives. New York/Piscataway, NJ: Wiley/IEEE Press, 2006, Ch. 1.

Yantra Harvest Energy Pvt. Ltd., "Medium Voltage Drives", www.yantraharvest.com, obtained from the World Wide Web Apr. 2013.

Yin, et al., "Analytical Investigation of the Switching Frequency Harmonic Characteristic for Common Mode Reduction Modulator", 2005 IEEE.

Zhang et al., "A Multilevel Converter Topology with Common Flying Capacitors", IEEE 978-1-4799-0336, 2013, pp. 1274-1280.

Zhang et al., "Multilevel Inverter Modulation Schemes to Eliminate Common-Mode Voltages", IEEE Transactions on Industry Applications, vol. 36, No. 6, Nov./Dec. 2000, pp. 1645-1653.

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012, pp. 1152-1158.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

Zhu et al., An Integrated AC Choke Design for Common-Mode Current Suppression in Neutral-Connected Power Converter Systems. IEEE Transactions on Power Electronics, 2012, pp. 1228-1236.

\* cited by examiner

COMMON VOLTAGE REDUCTION FOR ACTIVE FRONT END DRIVES

TECHNICAL FIELD

The subject matter disclosed herein relates to power conversion systems.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. Disclosed examples include power conversion system, non-transitory computer readable mediums, and methods of operating a power conversion system, in which inverter switching control signals are generated in a first mode according to an inverter carrier signal having an inverter switching frequency, and according to inverter modulation signals, to operate inverter switches to provide an AC output signal, and the inverter modulation signals are shifted in a second mode for low modulation index values to reduce common mode voltage.

BRIEF DESCRIPTION OF THE DRAWINGS

The following description and drawings set forth certain illustrative implementations of the disclosure in detail, which are indicative of one or more exemplary ways in which the various principles of the disclosure may be carried out. The illustrated examples are not exhaustive of the many possible embodiments of the disclosure. Various objects, advantages and novel features of the disclosure will be set forth in the following detailed description when considered in conjunction with the drawings.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale.

Figure 1:
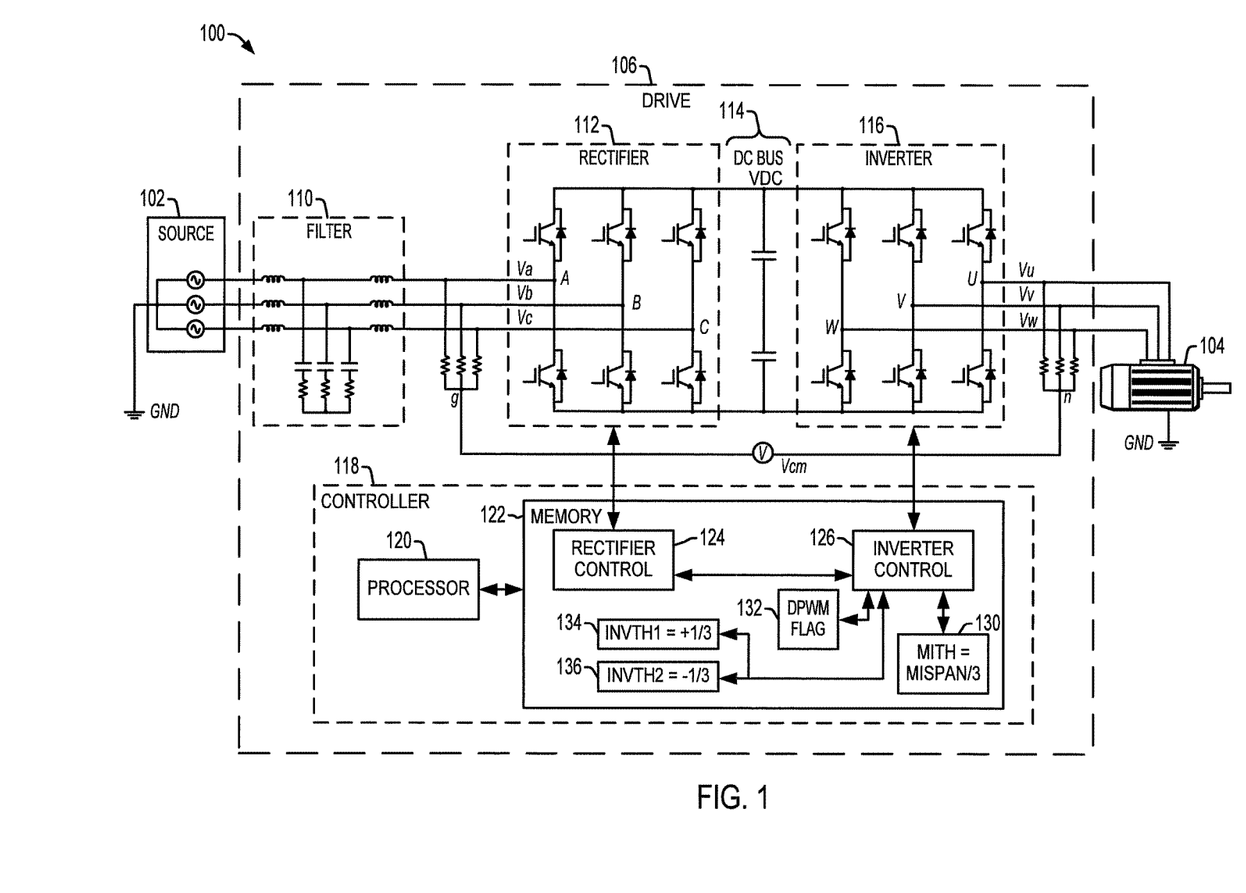
FIG. 1 is a schematic diagram.

A system 100 is shown in FIG. 1, which includes an AC power source 102, a motor load 104, and a power conversion system 106 (e.g., motor drive). The power conversion system 106 converts AC input power from the source 102 into AC output power to drive a motor load 104. In the illustrated example, the source 102 and the load 104 are multiphase components (e.g., three phase). The power conversion system 106 includes a three phase filter circuit 110, a three phase active front end (AFE) rectifier 112, a DC bus circuit 114, and a three phase inverter circuit 116. The filter circuit 110 includes an AC input to receive an AC signal from the output of the power source 102. The rectifier 112 includes a rectifier input to receive an AC input signal from an output of the filter circuit 110. The rectifier 112 has an output to provide a DC bus voltage signal (e.g., DC bus voltage signal VDC) across a DC bus capacitor CDC the DC bus circuit 114 during a normal operating mode. The inverter 116 converts the DC bus voltage signal VDC to an AC output signal to deliver output power to the motor load 104.

The power conversion system 106 includes a controller 118 with at least one processor 120 and a memory 122. The controller 118 and the components thereof may be any suitable hardware, processor-executed software, processor-executed firmware, logic, or combinations thereof that are adapted, programmed, or otherwise configured to implement the functions illustrated and described herein. The controller 118 in certain embodiments may be implemented, in whole or in part, as software components executed using one or more processing elements, such as one or more processors 120, and may be implemented as a set of sub-components or objects including computer executable instructions stored in the non-transitory computer readable electronic memory 122 for operation using computer readable data executing on one or more hardware platforms such as one or more computers including one or more processors, data stores, memory, etc. The components of the controller 118 may be executed on the same computer processor or in distributed fashion in two or more processing components that are operatively coupled with one another to provide the functionality and operation described herein.

The controller 118 in one example includes multiple processors to individually implement rectifier and inverter control functions. In the example of FIG. 1, the processor 120 executes computer executable instructions stored in the memory 122 to implement various motor control functions. The memory 122 in this example includes executable instructions to implement a rectifier control component 124 and an inverter control component 126. The controller 118 provides switching control signals to operate the rectifier 112 and the inverter 116 during normal operation. In one example, the controller 118 operates the drive 106 in a first mode (e.g., a NORMAL mode) and a second mode (e.g., CMR mode) for reducing common mode voltages (e.g., Vcm between an internal ground node "g" and an internal neutral node "n" in FIG. 1). In the system configuration of FIG. 1, a neutral of the AC input source 102 is connected to a ground node or connection (e.g., labeled GND), and the motor load 104 is also connected to the ground node. Other grounding configurations are possible in other implementations.

In one implementation, the controller 118 selects the current operating mode according to an inverter modulation index (MI), where the modulation index value represents the amount of output power used to drive the motor load 104. In one possible implementation, the controller 118 stores and updates a modulation index threshold value 130 (MITH) in the memory 122. In one example, the controller 118 operates in the first mode (NORMAL) when the inverter modulation index is greater than or equal to the modulation index threshold value 130 (e.g., when MI>=MITH), and the controller 118 operates in the second mode (CMR) to facilitate common mode voltage reduction when the inverter modulation index is less than the modulation index threshold value 130 (e.g., when MI<MITH). In one example, the modulation index threshold value 130 (MITH) is one third of a span of the inverter modulation index value MI. In other examples, a different inverter modulation index value can be used.

The controller 118 in one example provides the rectifier and inverter switching control signals using rectifier and inverter carrier signals, such as triangle carriers with an active rectifier switching frequency higher than the inverter switching frequency. The individual switching control signals are generated in one example as pulse width modulated signals based on comparison of phase-specific modulation signals with the carrier signal. In one example, when a given modulation signal is above a triangular carrier signal, the associated switch is turned on, and the switch is turned off when the modulation signal is less than or equal to the carrier signal. Similar pulse width modulation signal generation techniques can be used for both the rectifier 112 and the inverter 116 in one example. The carrier signal modulation concept can be implemented in analog circuits, and/or in digital form, for example, by computing modulation signal values and a carrier signal value, and performing the comparison and resulting PWM switching signal generation in firmware or software.

The present concepts can advantageously facilitate operation at a rectifier switching frequency to increase the drive rating and reduce the drive size and/or cost. In one example, the rectifier PWM switching frequency is at least twice the inverter PWM switching frequency. In one implementation, moreover, the controller 118 is configured to operate the rectifier 112 in a discontinuous pulse width modulated mode (DPWM) in both the first and second modes. This discontinuous PWM operation inhibits switching of one of the switching rectifier phases (e.g., A, B or C) during a given time interval, for example, ⅙ of the rectifier switching cycle or switching period. Using rectifier side DPWM facilitates increasing the rectifier switching frequency due to lower switching losses, which in turn allows reduced LCL filter size/cost, and reduced rectifier IGBT switching losses.

In one example, the controller 118 implements the DPWM on rectifier operation by generating the switching control signals to operate switches of the switching rectifier 112 using a zero vector (e.g., 111 or 000) during a given switching interval. In the example of FIG. 1, the controller 118 stores and updates a flag or value 132 (e.g., DPWM FLAG) in the memory 122. In this example, the flag or value 132 has one of two possible states, including a first state (e.g., +1) that indicates the rectifier controller 124 is currently using a first zero vector (e.g., 111 that turns all the upper rectifier switches on and turns all the lower rectifier switches off) for DPWM operation of the rectifier 112, and a second state (e.g., −1) that indicates the rectifier controller 124 is currently using a second zero vector (e.g., 000 that turns all the lower rectifier switches on and turns all the upper rectifier switches off) for DPWM operation of the rectifier 112. In certain examples, the rectifier 112 and the inverter 116 include isolated gate bipolar transistors (IGBTs), and the same IGBTs size and type can be used in both the rectifier 112 and the inverter 116. The disclosed concepts can also be employed for common mode reduction when the rectifier side switches operated according to normal three phase PWM switching control techniques.

In addition, the processor 120 maintains first and second inverter threshold values 134 (INVTH1) and 136 (INVTH2) in the memory 122. In one example, inverter modulation signals have a span of −1 to +1, the first inverter threshold value 134 is +⅓, and the second inverter threshold value 136 is −⅓. The controller 118 includes driver circuitry (not shown) to deliver switching control signals to switches of the active rectifier 112 and the inverter 116 according to pulse width modulated switching signals generated by the rectifier control component 124 and the inverter control component 126. In one example, the rectifier control component 124 generates pulse width modulated rectifier switching control signals to operate switches of the rectifier 112 to convert an AC input signal to control the DC bus voltage signal VDC according to a feedback signal or value by converting a multiphase AC input signal (e.g., voltages Va, Vb and Vc at input phases A, B and C, respectively) to provide the DC bus voltage signal VDC to the DC bus circuit 114. In one example, the inverter control component 126 generates pulse width modulated inverter switching control signals to operate switches of the inverter 116 to provide a multiphase AC output signal (e.g., voltages Vu, Vv and Vw at output phases U, V, and W, respectively) to the load 104 according to one or more feedback signals or values by converting the DC bus voltage signal VDC to implement one or more load control operating parameters, such as motor speed, torque, etc.

Figure 2:
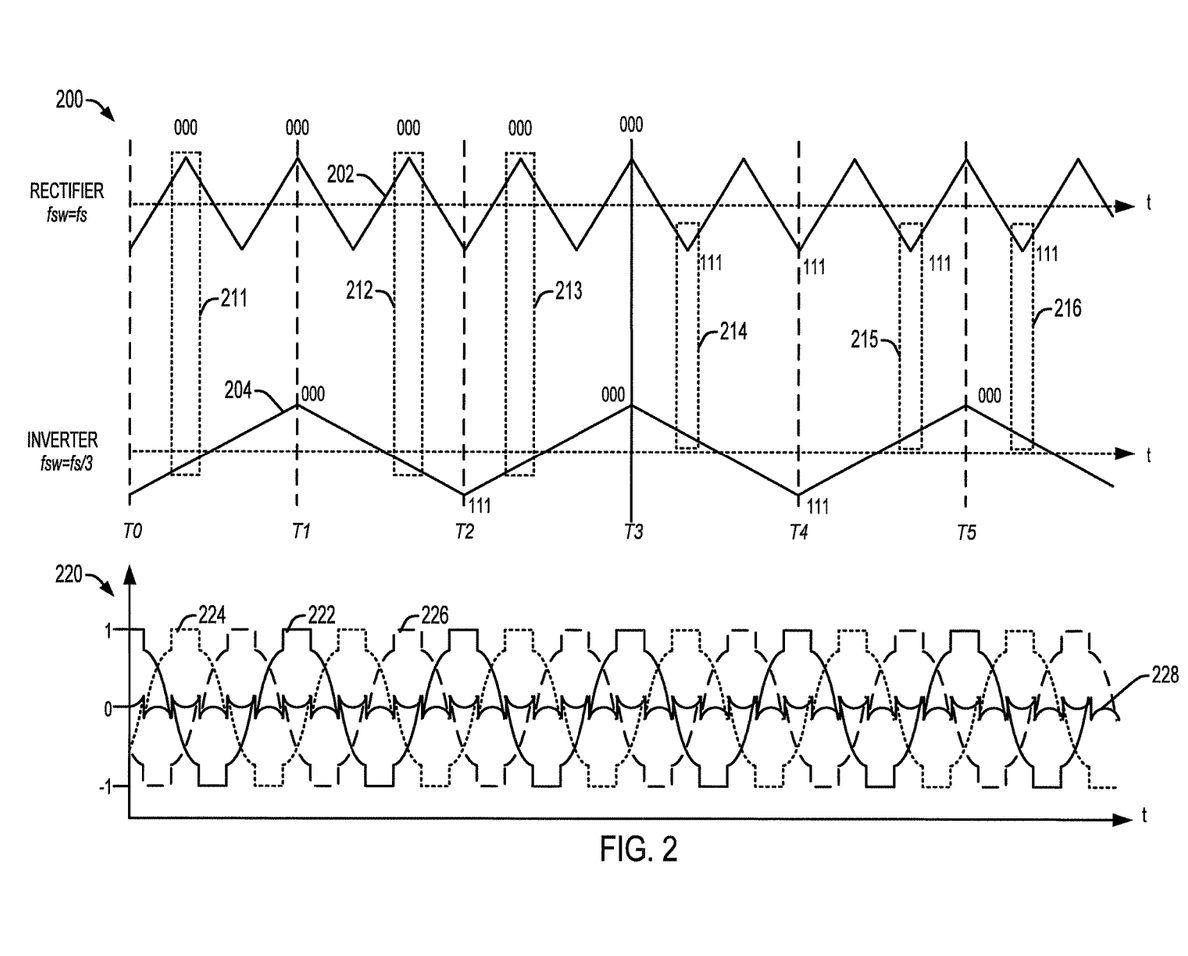
FIG. 2 is a signal diagram.

FIG. 2 shows a graph 200 with an example triangle carrier signal curve 202 and an example triangular inverter carrier signal curve 204 with a frequency of one third of the rectifier switching frequency. The graph 200 shows example times T0, T2 and T4 corresponding to valleys in the inverter carrier curve 204, as well as times T1, T3 and T5 corresponding to inverter carrier peaks. In other examples, the ratio of the inverter switching frequency (i.e., the inverter carrier signal frequency) to the rectifier switching frequency (i.e., the rectifier carrier signal frequency) is an integer fraction, e.g., ⅔, ¼, ⅗, etc. In certain examples, individual peaks and valleys of the inverter carrier signal are aligned with peaks or valleys of the rectifier carrier signal, as shown in FIG. 2 and in FIG. 4 below. In this regard, certain benefits are achieved by increasing the rectifier PWM switching frequency, for example, to reduce input current total Harmonic distortion (THD), to improve control performance, and to reduce the size and/or cost of the LCL filter. In addition, it is desirable to have low common mode voltage to reduce motor bearing degradation.

The graph 200 also shows time windows or intervals 211, 212 and 213 where the rectifier carrier curve 202 has peaks that correspond to a 000 rectifier DPWM zero vector while the inverter carrier signal 204 is below the center of the inverter carrier signal span. Further time windows 214, 215 and 216 correspond to the rectifier carrier curve 202 having valleys that correspond to a 111 rectifier DPWM zero vector while the inverter carrier signal 204 is above the center of its span. FIG. 2 also shows a graph 220 with three phase-specific rectifier modulation curves 222 (phase A), 224 (phase B) and 226 (phase C) within a rectifier modulation/carrier span that ranges from −1 to +1. The graph 220 also shows a common mode voltage curve 228 resulting from the PWM converter operation of the rectifier 112. The common mode signal is used to generate the DPWM switching signals, which are used to control the rectifier gates switching. If the rectifier switching is not well controlled, higher common mode voltage (+/−VDC) will be generated which may induce premature bearing degradation in the motor load 104. Common mode voltage in the system is a result of not well coordinated control of rectifier/inverter, and in particular, because of the control of inverter.

Figure 3:
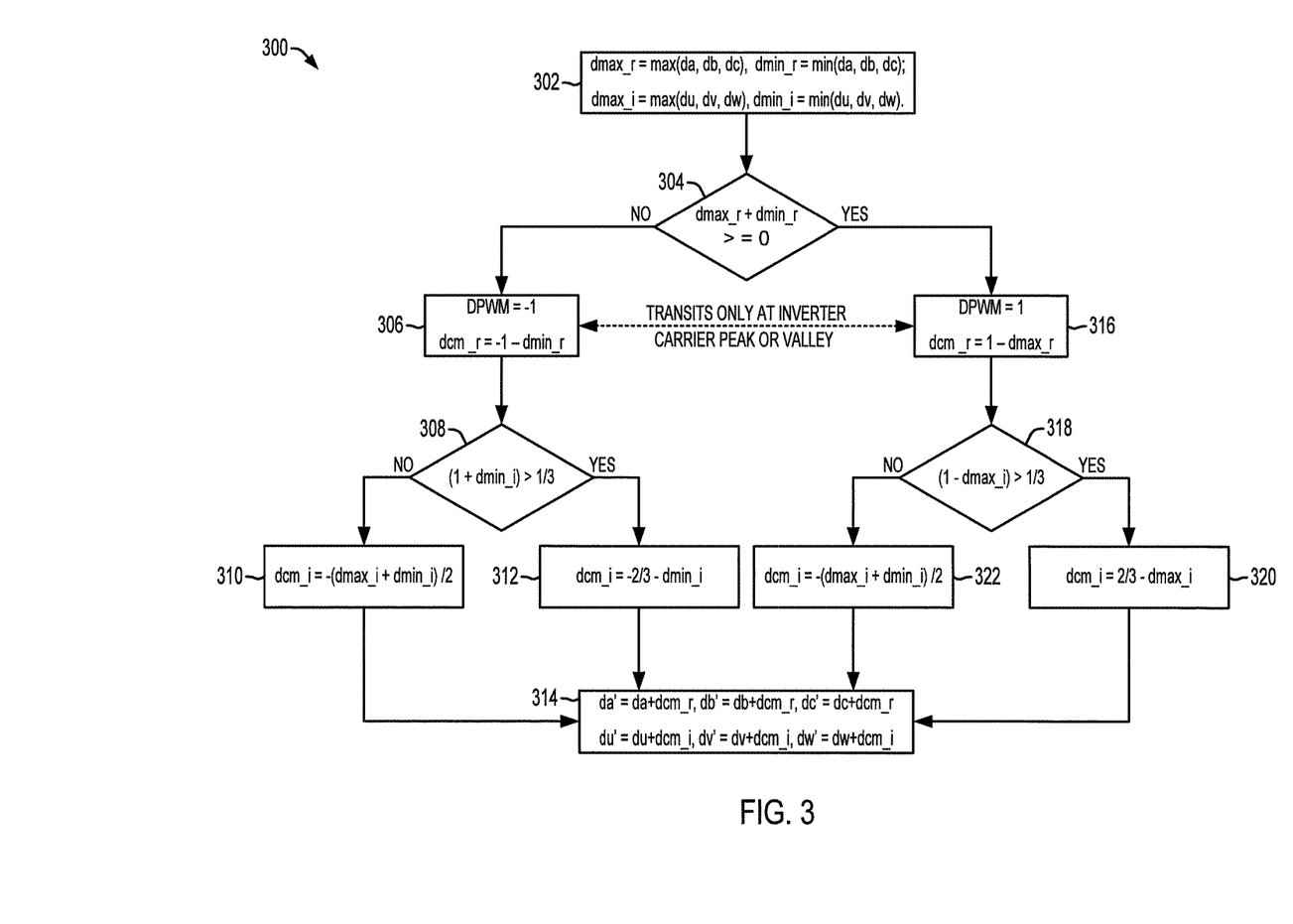
FIG. 3 is a flow diagram.
Figure 4:
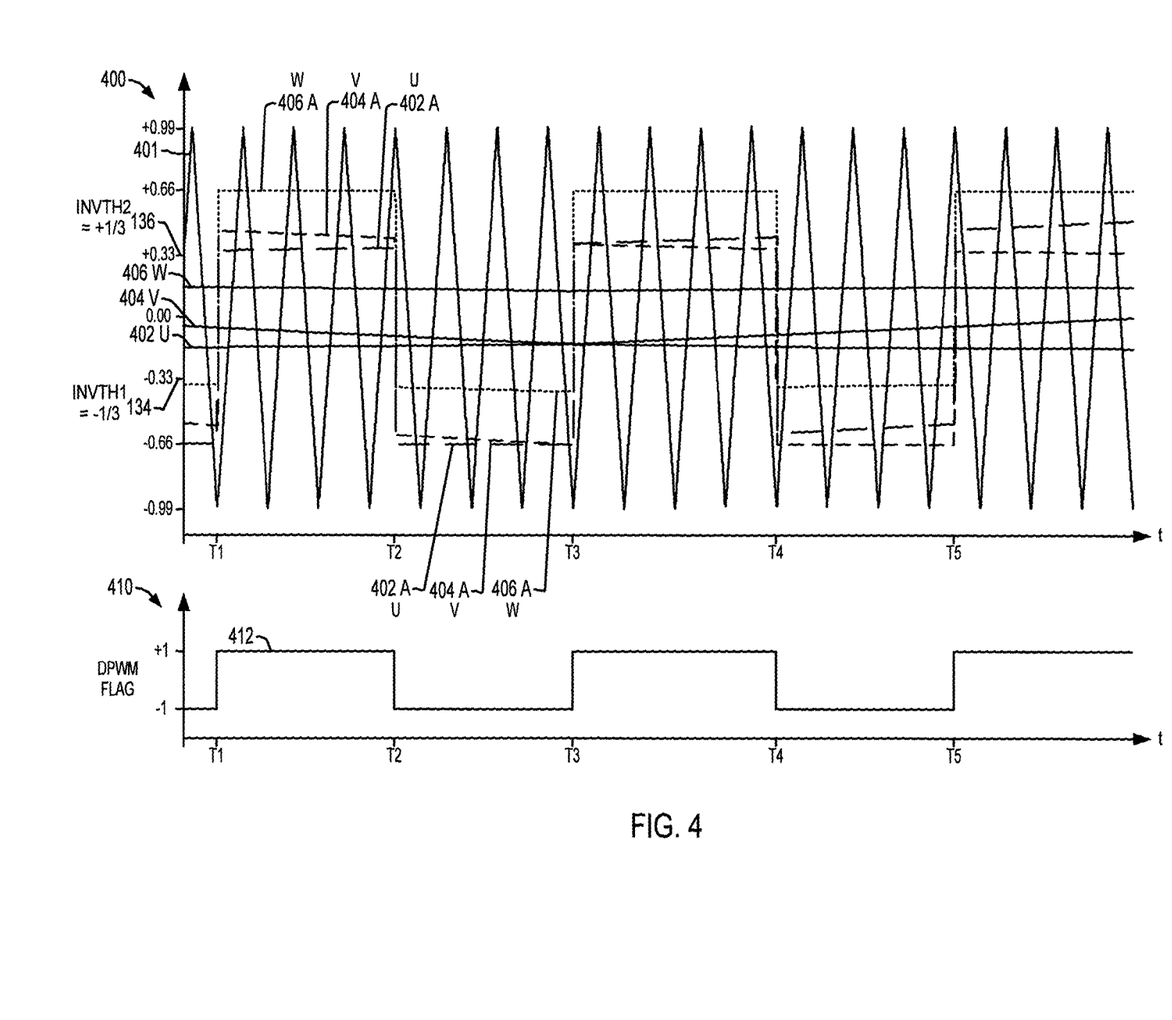
FIG. 4 is a signal diagram.

Referring also to FIGS. 3 and 4, FIG. 3 shows a method 300 of operating a power conversion system, and FIG. 4 shows graphs 400 and 410 with signal waveforms during operation of the example system 106 according to the example method 300. In one example, the method 300 is implemented as computer executable instructions stored in the memory 122 of the controller 118 in FIG. 1 or in another non-transitory computer readable medium, with the control processor 120 executing the program instructions to cause the processor 120 to operate the rectifier 112 and the inverter 116 by generating pulse width modulated switching control signals.

The graph 400 in FIG. 4 shows an example inverter carrier signal 401 along with example inverter modulation signals 402 (inverter output phase U), 404 (phase V) and 406 (phase W), each within a corresponding span that ranges from −1 to +1. A graph 410 shows an example curve 412 of the value of the DPWM FLAG (e.g., flag 132 in the memory 122 of FIG. 1). The controller 118 stores and maintains the value of the flag 132 at one of two possible states. In this example, the flag 132 (curve 412 in FIG. 4) has a first state (e.g., value of +1) that indicates the rectifier controller 124 is currently using a first zero vector (e.g., rectifier zero vector 111 from T1 to T2 and from T3 to T4 in FIG. 4). The flag 132 has a second state (e.g., value of −1) that indicates the rectifier controller 124 is currently using a second zero vector (e.g., zero vector 000 from T2 to T3 and from T4 to T5 for DPWM operation of the rectifier 112.

The example method 300 in FIG. 3 includes generating rectifier switching control signals to operate the rectifier switches according to a rectifier carrier signal (e.g., 202) having a rectifier switching frequency to provide a DC bus voltage signal (e.g., VDC). The method 300 includes generating inverter switching control signals in a first mode (e.g., NORMAL), according to the inverter carrier signal (e.g., 204, 401) and according to a plurality of inverter modulation signals (e.g., 402, 404 and 406 in FIG. 4), to operate the inverter switches to provide the AC output signal to drive the connected load (e.g., motor load 104). The method 300 also include, in a second mode (e.g., CMR), selectively shifting the plurality of inverter modulation signals (e.g., 402, 404 and 406) by a non-zero first amount to generate corresponding shifted inverter modulation signal signals (e.g., 402A, 404A and 406A in FIG. 4), and generating the inverter switching control signals according to the inverter carrier signal (e.g., 204, 401), and according to the shifted inverter modulation signals (e.g., 402A, 404A, 406A), to operate the switches of the inverter (e.g., 116) at the inverter switching frequency to provide the AC output signal. In one example, the method 300 includes operating in the first mode (e.g., NORMAL) when an inverter modulation index is greater than a modulation index threshold value (e.g., 130, MITH in the memory 122 of FIG. 1), and operating in the second mode when the inverter modulation index is less than or equal to the modulation index threshold value.

The example method 300 can be implemented by the drive controller 118 to reduce the common mode voltage Vcm in the motor drive 106. This provides enhanced motor drive bearing protection without LCL filter de-rating of the LCL filter due to selection of different zero vectors. The method 300 provides a common mode reduction method for active front end (AFE) drives with different PWM frequencies for the rectifier 112 and inverter 116. In one example, the method 300 and operation of the controller 118 can reduce the common mode voltage Vcm down to +/−2 VDC/3 without any additional filter inductor losses or inverter side du/dt filter inductors or motor windings. This common mode voltage reduction, in turn, facilitates the use of different rectifier and inverter switching frequencies and enhanced power density in the motor drive power conversion system 106. In one implementation, the span of the inverter modulation signals 402, 404 and 406 ranges from −1 to +1, the first inverter threshold value 134 (INVTH1 is +⅓), and the second inverter threshold value 136 (INVTH2) is −⅓.

In the example of FIG. 3, the controller 118 is configured, in the second mode (e.g., CMR), to selectively increase the inverter modulation signals 402, 404 and 406 by a non-zero first amount when DPWM=+1. The controller 118 in one example determines the first amount such that the maximum one of the shifted inverter modulation signal signals 402A, 404A, 406A is shifted to be equal to the maximum span value minus the first inverter threshold value 134 (e.g., 1⅓=+⅔ in this example); or to selectively decrease the inverter modulation signals 402, 404 and 406 by the first amount such that the minimum one of the shifted inverter modulation signal signals 402A, 404A and 406A is equal to the minimum span minus the second inverter threshold value 136 (e.g., (−1)−(−⅓)=−⅔ in this example). In the example of FIG. 4, in the second mode, the controller 118 increases or shifts the modulation signals up when the DPWM flag 132 is +1 (curve 412, e.g., in response to the rectifier switching control signals using a first zero vector 111) and decreases or shifts the modulation signals down when the DPWM flag 132 is −1 (e.g., in response to the rectifier switching control signals using a first zero vector 000). In one implementation, as shown in FIG. 3, controller 118 switches between selectively increasing and selectively decreasing the plurality of inverter modulation signals 402, 404, 406 only at peaks and valleys of the inverter carrier signal 204, 401.

The example method 300 in FIG. 3 uses DPWM control for operating the rectifier 112 and uses space vector pulse width modulation (SVPWM) for inverter control in the NORMAL first mode. For reducing common mode voltages in the second mode (CMR), the controller 118 modifies the inverter control by selectively shifting the inverter modulation signals. In the example of FIG. 3, the initial modulation signals for the rectifier 112 and the inverter 116 are di (i=a, b, c, u, v, w), and dcm_j (j=r, i) are the common mode components injected into original modulation signals. In this example, moreover, di' (i=a, b, c, u, v, w) are the modified modulation signals for the rectifier/inverter, and dmax_j/dmin_j (j=r, i) is the maximum/minimum value of the rectifier/inverter original modulation signals. Also, DPWM (−1, 1) is the flag variable (e.g., 132 in FIG. 1) to indicate the rectifier zero vector. The inverter modulation switches between SVPWM (first mode for high modulation index) and the modified (e.g., shifted) PWM scheme (second mode for low modulation index). The switching threshold for these two modes in one implementation is a constant, e.g., ⅓, although other values can be used, and the threshold 130 (MITH) can be adjustable in some examples. When a modulation signal shift happens in the second mode, the maximum signal is shifted up to ⅔ or the minimal signal is shifted down to −⅔ in one example, depending on which zero vector is used on the rectifier side. After shifting, the controller 118 uses the adjusted modulation signals di' (i=a, b, c, u, v, w) to generate switching states for the rectifier 112 and the inverter 116.

The example method 300 in FIG. 3 begins at 302, where the controller 118 calculates the rectifier and inverter duty ratios based on DC bus voltage and inverter output control loops as da, db, dc and du, dv, dw. The controller 118 also computes or otherwise determines the maximum and minimum rectifier and inverter modulation signal values at 302. In one example, the calculated rectifier side values are dmax_r=max(da,db,dc), dmin_r=min(da,db,dc), and the calculated inverter side values are computed as dmax_i=max(du,dv,dw), dmin_i=min(du,dv,dw).

At 304, the controller 118 determines the value of the flag value 132 according to whether the rectifier zero vector is 000 or 111 according to the rectifier modulation signals. Based on rectifier side zero vector, the controller 118 determines the zero vector duty ratio of the inverter 116 and shift one zero vector duty ratio to be ⅙ of the span (e.g., span of −1 to +1), depending on the DPWM zero status flag 132. The controller 118 updates the rectifier and inverter duty ratios da, db, dc and du, dv, dw, and transitions the value of the flag 132 only with the inverter triangle carrier waveform at peaks/valleys.

In the example of FIG. 3, the controller 118 checks the rectifier zero vector by determining whether dmax_r+ dmin_r>=0. If so (YES at 304), the controller 118 sets the flag 132 DPWM=1 and sets dcm_r=1−dmax_r at 316, and otherwise (NO at 304) the controller 118 sets the flag 132 DPWM=−1 and sets dcm_r=−1−dmin_r at 306. If DPWM=−1 (e.g., between T2 and T3 in FIG. 4), the process 300 proceeds to 308, where the controller 118 determines whether 1+dmin_i>⅓. If so, (YES at 308), the controller 118 sets dcm_i=−⅔−dmin_i at 312. This decreases the inverter modulation signals 402, 404 and 406 by the first amount such that the minimum one of the shifted inverter modulation signal signals 402A, 404A and 406A is equal to the minimum span minus the second inverter threshold value 136 (e.g., (−1)−(−⅓)=−⅔ in this example). Otherwise (NO at 308), the controller 118 sets dcm_i=−(dmax_i+dmin_i)/2 at 310. The controller 118 then selectively shifts the inverter modulation values at 314, including updating the rectifier duty ratios as da'=da+dcm_r, db'=db+dcm_r and dc'=dc+dcm_r, and updating the inverter side duty ratios updated as du'=du+dcm_i, dv'=dv+dcm_i and dw'=dw+dcm_i.

If DPWM=+1 (YES at 304, between T1 and T2 in FIG. 4), the controller 118 sets dcm_r=1−dmax_r at 316, and determines whether 1−dmax_i>⅓ at 318. If so, (YES at 318), the controller 118 sets dcm_i=⅔−dmax_i at 320. This shifts the inverter modulation signals up such that the maximum one of the shifted inverter modulation signal signals 402A, 404A, 406A is shifted to be equal to the maximum span value minus the first inverter threshold value 134 (e.g., 1−⅓=+⅔ in this example). Otherwise (NO at 318), the controller 118 sets dcm_i=−(dmax_i+dmin_i)/2 at 322. The controller 118 then selectively shifts the inverter modulation values at 314, as described above. Once the modulation signal values have been selectively adjusted, these are used to generate the PWM switching control signals to operate the power conversion system 106.

Figure 5:
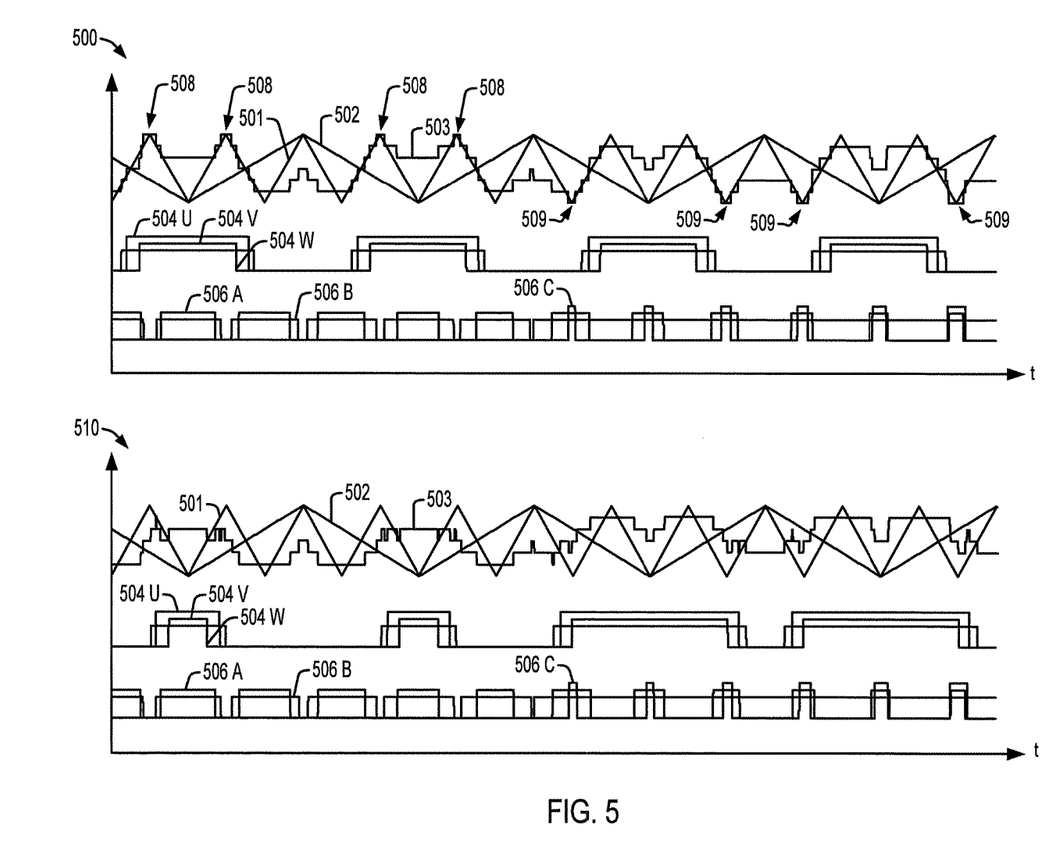
FIG. 5 is a signal diagram.
Figure 6:
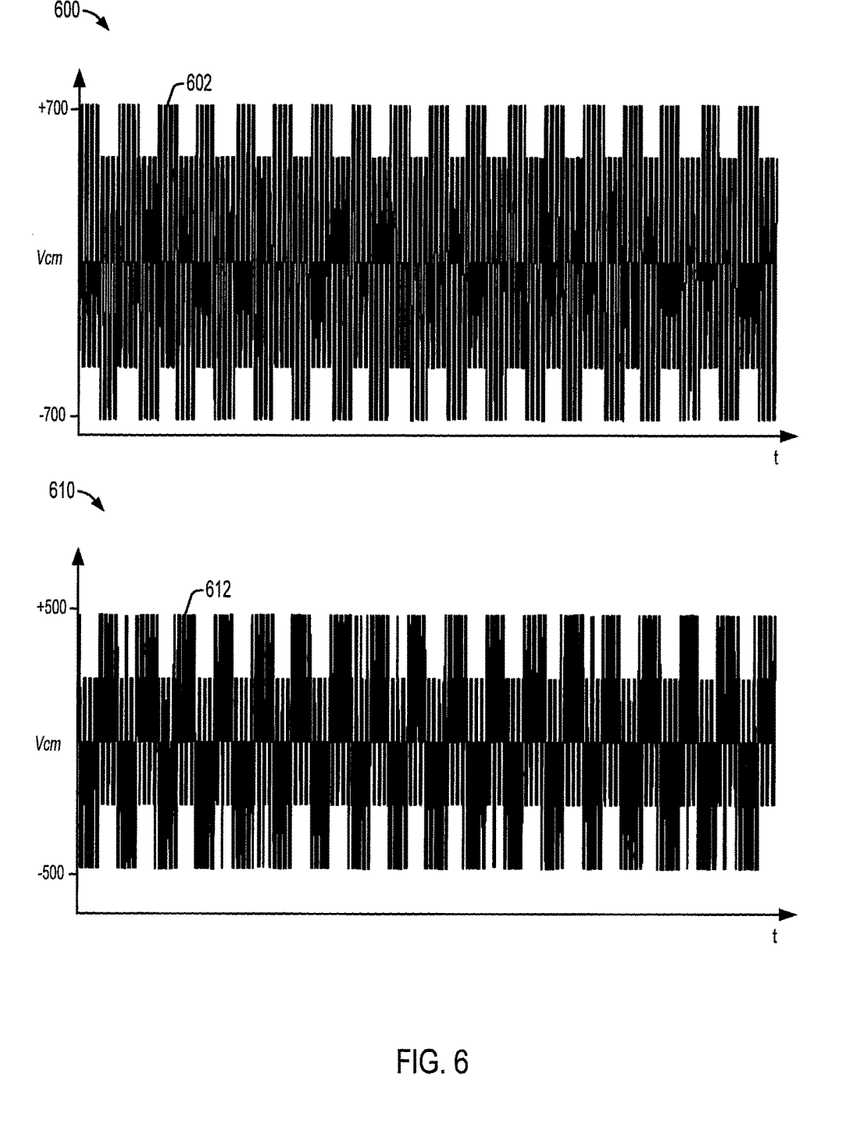
FIG. 6 is a signal diagram.
Figure 7:
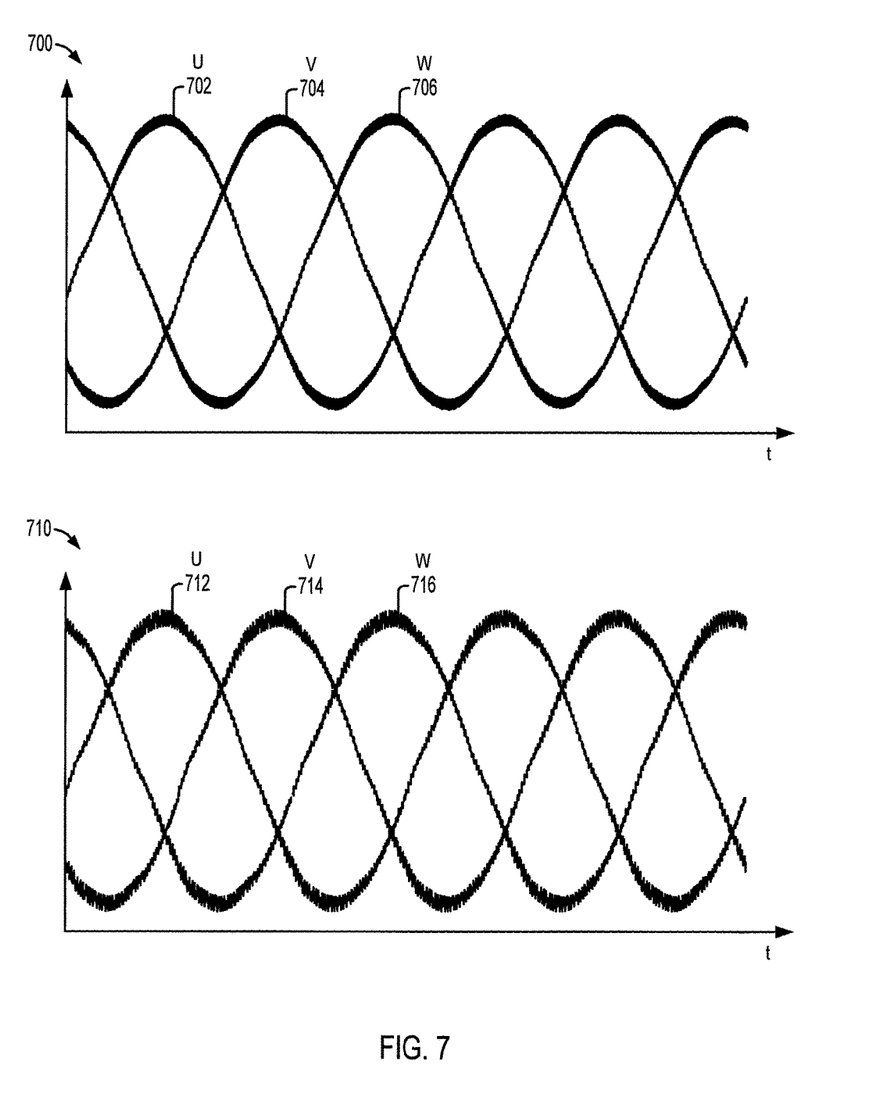
FIG. 7 is a signal diagram.

Referring also to FIGS. 5-7, FIG. 5 illustrates comparative modulation and common mode signals for an example (graph 500) with no selective inverter modulation signal adjustment, and an implementation (graph 510) of the selective modulation signal shifting by the controller 118 according to the example method 300. The graph 500 shows a rectifier carrier curve 501, an inverter carrier curve 502, and a common mode voltage curve 503 (Vcm). The graph 500 also shows example PWM inverter switching control pulse signals 504 U (Phase U), 504 V (phase V) and 504 W (phase W), and example PWM rectifier switching control pulse signals 506 A (Phase A), 506 B (phase B) and 506 C (phase C). In the case without modulation signal shifting, the common mode voltage curve 503 transitions to +VDC at points 508 in the graph 500 and transitions to −VDC at points 509. The graph 510 shows corresponding curves 501-504 and 506 for the example controller 118 operating according to the method 300 of FIG. 3. The selective shifting of the inverter modulation signals (e.g., shifted signals 402A, 404A and 406A in FIG. 4) limits the maximum and minimum values of the common mode voltage Vcm to +/−2 VDC/3.

A graph 600 in FIG. 6 shows a common mode voltage curve 602 for an example motor drive implementation at an inverter output frequency of 10 Hz and an inverter carrier switching frequency of 1.33 kHz with no selective inverter modulation signal adjustment, which exhibits common mode voltages Vcm with peaks in excess of 700 volts (e.g., approximately +/−VDC). FIG. 6 also provides a graph 610 with a common mode voltage curve 612 for an example motor drive implementation at an inverter output frequency of 10 Hz and an inverter carrier switching frequency of 1.33 kHz using selective inverter modulation signal adjustment as described above. This example limits the common mode voltages Vcm with peaks less than 500 volts (e.g., approximately +/−2 VDC/3).

FIG. 7 provides a graph 700 with inverter output current curves 702 (phase U), 704 (phase V), and 706 (phase W) at an inverter output frequency of 10 Hz and an inverter carrier switching frequency of 1.33 kHz for an example motor drive implementation with no selective inverter modulation signal adjustment. A graph 710 in FIG. 7 shows inverter output current curves 712 (phase U), 714 (phase V), and 716 (phase W) at an inverter output frequency of 10 Hz and an inverter carrier switching frequency of 1.33 kHz an example motor drive implementation that uses the above-described selective inverter modulation signal adjustment in FIG. 3. The example currents 712, 714 and 716 from the modified PWM scheme include higher ripple, as expected due to the duty ratio redistribution on zero vectors. From calculations, the original output currents in the graph 700 have an average total harmonic distortion (THD) of 2.82%, while the calculated THD in the currents 712, 714 and 716 in the graph 710 is 3.52%. The calculated THD levels of the total harmonics from both cases are both very low compared to the fundamental current, and the tradeoff in THD associated with the presently described examples is small compared with the significant common mode voltage improvements.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". This description uses examples to disclose various embodiments and also to enable any person skilled The following is claimed:

1. A power conversion system, comprising:
   a switching rectifier, including a rectifier input to receive an AC input signal, and a rectifier output to provide a DC bus voltage signal;
   a DC bus circuit, including a DC bus capacitor coupled to receive the DC bus voltage signal from the rectifier output;
   an inverter to convert the DC bus voltage signal to an AC output signal to deliver output power to a load; and
   a controller configured to:
      generate rectifier switching control signals to operate switches of the switching rectifier according to a rectifier carrier signal having a rectifier switching frequency to provide the DC bus voltage signal to the DC bus circuit;
      in a first mode, generate the inverter switching control signals according to an inverter carrier signal having an inverter switching frequency and according to a plurality of inverter modulation signals to operate switches of the inverter to provide the AC output signal; and
      in a second mode, selectively shift the plurality of inverter modulation signals by a non-zero first amount to generate a corresponding plurality of shifted inverter modulation signals, and generate the inverter switching control signals according to the inverter carrier signal and according to the plurality of shifted inverter modulation signals to operate the switches of the inverter at the inverter switching frequency to provide the AC output signal;
   wherein the controller is configured to operate in the first mode when an inverter modulation index is greater than a modulation index threshold value; and wherein the controller is configured to operate in the second mode when the inverter modulation index is less than or equal to the modulation index threshold value; and
   wherein the controller is configured, in the second mode, to: (i) selectively increase the plurality of inverter modulation signals by the non-zero first amount such that a maximum one of the shifted inverter modulation signals is equal to a difference between a maximum span of the inverter modulation signals and a first inverter threshold value; or (ii) selectively decrease the plurality of inverter modulation signals by the non-zero first amount such that a minimum one of the shifted inverter modulation signals is equal to a difference between a minimum span of the inverter modulation signals and a second inverter threshold value.

2. The power conversion system of claim 1, wherein the modulation index threshold value is one third of a span of an inverter modulation index value.

3. The power conversion system of claim 1, wherein the controller is configured, in the second mode, to: (i) selectively increase the plurality of inverter modulation signals by the non-zero first amount in response to the rectifier switching control signals using a first zero vector that turns all upper switches of the rectifier on and turns all lower switches of the rectifier off, and (ii) selectively decrease the plurality of inverter modulation signals by the non-zero first amount in response to the rectifier switching control signals using a second zero vector that turns all the upper switches of the rectifier off and turns all the lower switches of the rectifier on.

4. The power conversion system of claim 1, wherein a span of the inverter modulation signals ranges from −1 to +1, wherein the first inverter threshold value is +⅓, and wherein the second inverter threshold value is −⅓.

5. The power conversion system of claim 1, wherein the rectifier switching frequency is higher than the inverter switching frequency.

6. The power conversion system of claim 5, wherein individual peaks and valleys of the inverter carrier signal are aligned with peaks or valleys of the rectifier carrier signal.

7. The power conversion system of claim 6, wherein the controller is configured, in the second mode, to switch between selectively increasing and selectively decreasing the plurality of inverter modulation signals only at peaks and valleys of the inverter carrier signal.

8. The power conversion system of claim 1, wherein the controller is configured, in the first and second modes, to generate the rectifier switching control signals to operate switches of the switching rectifier using a zero vector that turns all switches of a single rectifier phase on or turns all switches of the single rectifier phase off.

9. The power conversion system of claim 1, wherein the controller is configured, in the second mode, to switch should between selectively increasing and selectively decreasing the plurality of inverter modulation signals only at peaks and valleys of the inverter carrier signal.

10. A power conversion system, comprising:
    a switching rectifier, including a rectifier input to receive an AC input signal, and a rectifier output to provide a DC bus voltage signal;
    a DC bus circuit, including a DC bus capacitor coupled to receive the DC bus voltage signal from the rectifier output;
    an inverter to convert the DC bus voltage signal to an AC output signal to deliver output power to a load; and
    a controller configured to:
       generate rectifier switching control signals to operate switches of the switching rectifier according to a rectifier carrier signal having a rectifier switching frequency to provide the DC bus voltage signal to the DC bus circuit;
       in a first mode, generate the inverter switching control signals according to an inverter carrier signal having an inverter switching frequency and according to a plurality of inverter modulation signals to operate switches of the inverter to provide the AC output signal; and
       in a second mode, selectively shift the plurality of inverter modulation signals by a non-zero first amount to generate a corresponding plurality of shifted inverter modulation signals, and generate the inverter switching control signals according to the inverter carrier signal and according to the plurality of shifted inverter modulation signals to operate the switches of the inverter at the inverter switching frequency to provide the AC output signal; and
       operate in the first mode when an inverter modulation index is greater than a modulation index threshold value; and wherein the controller is configured to operate in the second mode when the inverter modulation index is less than or equal to the modulation index threshold value;

wherein the controller is configured, in the second mode, to: (i) selectively increase the plurality of inverter modulation signals by the non-zero first amount in response to the rectifier switching control signals using a first zero vector that turns all upper switches of the rectifier on and turns all lower switches of the rectifier off, and (ii) selectively decrease the plurality of inverter modulation signals by the non-zero first amount in response to the rectifier switching control signals using a second zero vector that turns all the upper switches of the rectifier off and turns all the lower switches of the rectifier on.

11. The power conversion system of claim 10, wherein the modulation index threshold value is one third of a span of an inverter modulation index value.

12. The power conversion system of claim 10, wherein the rectifier switching frequency is higher than the inverter switching frequency.

13. The power conversion system of claim 12, wherein individual peaks and valleys of the inverter carrier signal are aligned with peaks or valleys of the rectifier carrier signal.

14. The power conversion system of claim 13, wherein the controller is configured, in the second mode, to switch between selectively increasing and selectively decreasing the plurality of inverter modulation signals only at peaks and valleys of the inverter carrier signal.

15. The power conversion system of claim 10, wherein the controller is configured, in the second mode, to switch between selectively increasing and selectively decreasing the plurality of inverter modulation signals only at peaks and valleys of the inverter carrier signal.

16. A method of operating a power conversion system, the method comprising:
generating rectifier switching control signals to operate switches of a switching rectifier according to a rectifier carrier signal having a rectifier switching frequency to provide a DC bus voltage signal;
in a first mode, generating inverter switching control signals according to an inverter carrier signal having an inverter switching frequency, and according to a plurality of inverter modulation signals, to operate switches of an inverter to provide an AC output signal;
in a second mode, selectively shifting the plurality of inverter modulation signals by a non-zero first amount to generate a corresponding plurality of shifted inverter modulation signals, and generating the inverter switching control signals according to the inverter carrier signal, and according to the plurality of shifted inverter modulation signals, to operate the switches of the inverter at the inverter switching frequency to provide the AC output signal;
operating in the first mode when an inverter modulation index is greater than a modulation index threshold value; and
operating in the second mode when the inverter modulation index is less than or equal to the modulation index threshold value; and
in the second mode, (i) selectively increasing the plurality of inverter modulation signals by the non-zero first amount such that a maximum one of the shifted inverter modulation signals is equal to a difference between a maximum span of the inverter modulation signals and a first inverter threshold value; or (ii) selectively decreasing the plurality of inverter modulation signals by the non-zero first amount such that a minimum one of the shifted inverter modulation signals is equal to a difference between a minimum span of the inverter modulation signals and a second inverter threshold value.

17. A non-transitory computer readable medium, comprising computer executable instructions that, when executed by at least one processor, cause the at least one processor to:
generate rectifier switching control signals to operate switches of a switching rectifier according to a rectifier carrier signal having a rectifier switching frequency to provide a DC bus voltage signal;
in a first mode, generate inverter switching control signals according to an inverter carrier signal having an inverter switching frequency, and according to a plurality of inverter modulation signals, to operate switches of an inverter to provide an AC output signal;
in a second mode, selectively shift the plurality of inverter modulation signals by a non-zero first amount to generate a corresponding plurality of shifted inverter modulation signals, and generate the inverter switching control signals according to the inverter carrier signal, and according to the plurality of shifted inverter modulation signals, to operate the switches of the inverter at the inverter switching frequency to provide the AC output signal;
operate in the first mode when an inverter modulation index is greater than a modulation index threshold value; and
operate in the second mode when the inverter modulation index is less than or equal to the modulation index threshold value; and
in the second mode, (i) selectively increase the plurality of inverter modulation signals by the non-zero first amount such that a maximum one of the shifted inverter modulation signals is equal to a difference between a maximum span of the inverter modulation signals and a first inverter threshold value; or (ii) selectively decrease the plurality of inverter modulation signals by the non-zero first amount such that a minimum one of the shifted inverter modulation signals is equal to a difference between a minimum span of the inverter modulation signals and a second inverter threshold value.

18. A method of operating a power conversion system, the method comprising:
generating rectifier switching control signals to operate switches of a switching rectifier according to a rectifier carrier signal having a rectifier switching frequency to provide a DC bus voltage signal;
in a first mode, generating inverter switching control signals according to an inverter carrier signal having an inverter switching frequency, and according to a plurality of inverter modulation signals, to operate switches of an inverter to provide an AC output signal;
in a second mode, selectively shifting the plurality of inverter modulation signals by a non-zero first amount to generate a corresponding plurality of shifted inverter modulation signals, and generating the inverter switching control signals according to the inverter carrier signal, and according to the plurality of shifted inverter modulation signals, to operate the switches of the inverter at the inverter switching frequency to provide the AC output signal;
operating in the first mode when an inverter modulation index is greater than a modulation index threshold value;

operating in the second mode when the inverter modulation index is less than or equal to the modulation index threshold value; and in the second mode, (i) selectively increasing the plurality of inverter modulation signals by the non-zero first amount in response to the rectifier switching control signals using a first zero vector that turns all upper switches of the rectifier on and turns all lower switches of the rectifier off, and (ii) selectively decreasing the plurality of inverter modulation signals by the non-zero first amount in response to the rectifier switching control signals using a second zero vector that turns all the upper switches of the rectifier off and turns all the lower switches of the rectifier on.

19. A non-transitory computer readable medium, comprising computer executable instructions that, when executed by at least one processor, cause the at least one processor to:

generate rectifier switching control signals to operate switches of a switching rectifier according to a rectifier carrier signal having a rectifier switching frequency to provide a DC bus voltage signal;

in a first mode, generate inverter switching control signals according to an inverter carrier signal having an inverter switching frequency, and according to a plurality of inverter modulation signals, to operate switches of an inverter to provide an AC output signal;

in a second mode, selectively shift the plurality of inverter modulation signals by a non-zero first amount to generate a corresponding plurality of shifted inverter modulation signals, and generate the inverter switching control signals according to the inverter carrier signal, and according to the plurality of shifted inverter modulation signals, to operate the switches of the inverter at the inverter switching frequency to provide the AC output signal;

operate in the first mode when an inverter modulation index is greater than a modulation index threshold value; and operate in the second mode when the inverter modulation index is less than or equal to the modulation index threshold value; and in the second mode, (i) selectively increase the plurality of inverter modulation signals by the non-zero first amount in response to the rectifier switching control signals using a first zero vector that turns all upper switches of the rectifier on and turns all lower switches of the rectifier off, and (ii) selectively decrease the plurality of inverter modulation signals by the non-zero first amount in response to the rectifier switching control signals using a second zero vector that turns all the upper switches of the rectifier off and turns all the lower switches of the rectifier on.

* * * * *